July 22, 1958   O. C. SLADEK   2,844,056
MACHINES FOR CUTTING AND STRIPPING INSULATED CONDUCTORS
Filed July 20, 1955   2 Sheets-Sheet 1
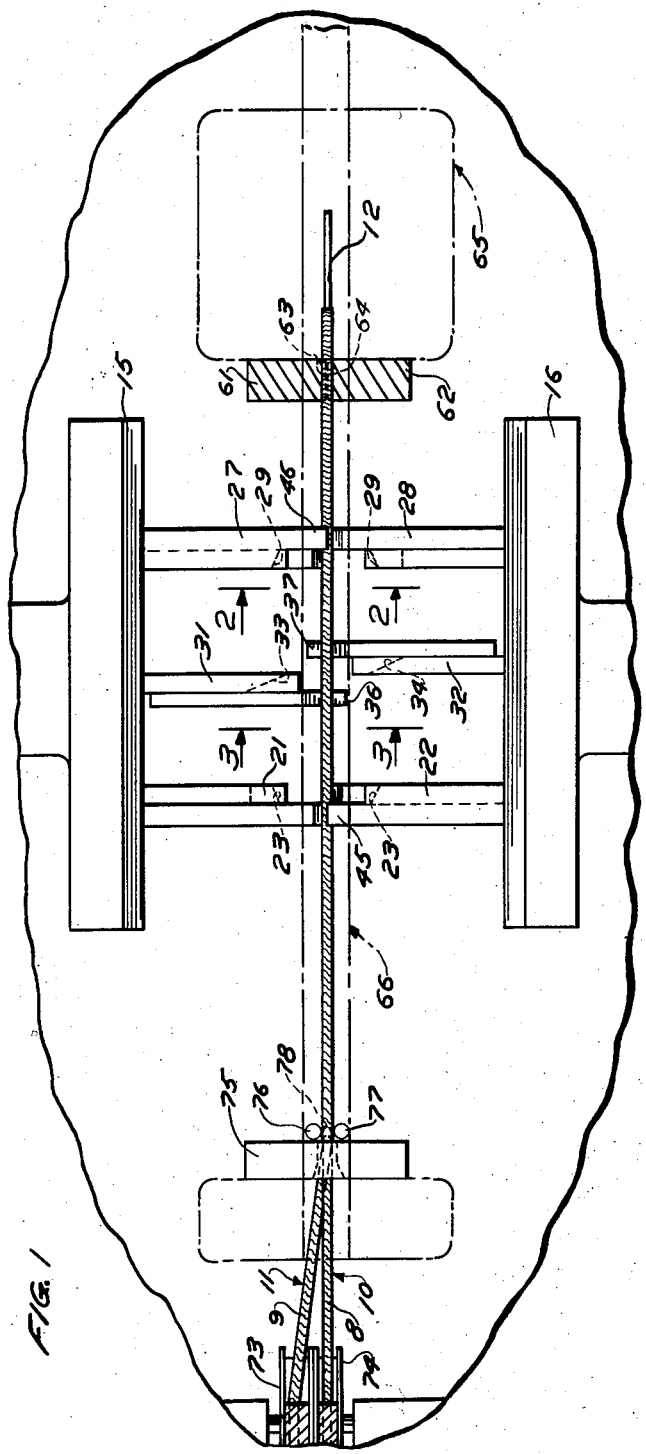
INVENTOR
O.C. SLADEK
BY C. N. Hamilton
ATTORNEY July 22, 1958 O. C. SLADEK 2,844,056
MACHINES FOR CUTTING AND STRIPPING INSULATED CONDUCTORS
Filed July 20, 1955 2 Sheets-Sheet 2
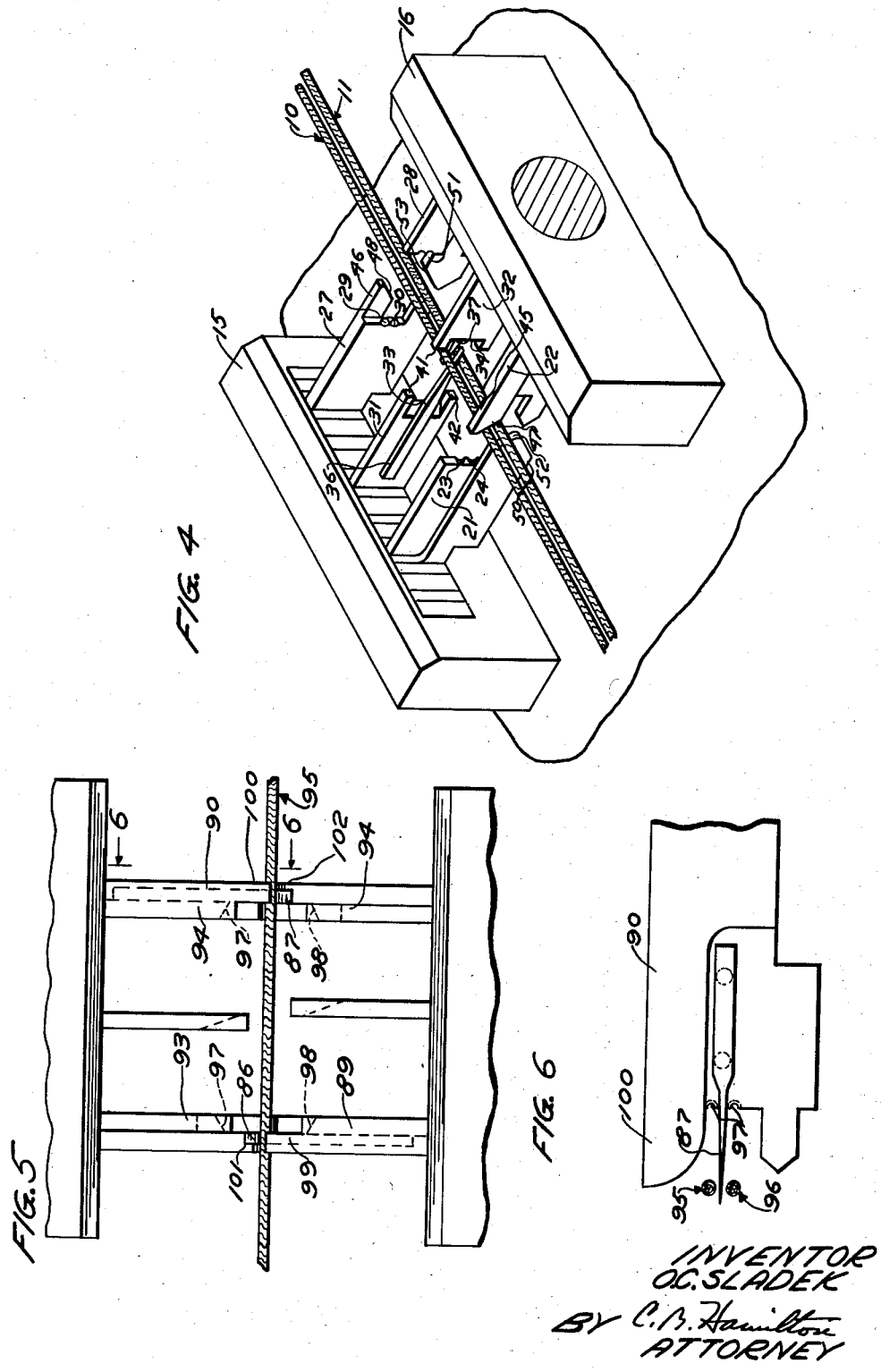
INVENTOR
O.C. SLADEK
BY C.B. Hamilton
ATTORNEY

United States Patent Office 2,844,056
Patented July 22, 1958

2,844,056

MACHINES FOR CUTTING AND STRIPPING INSULATED CONDUCTORS

Owen C. Sladek, Berwyn, Ill., assignor to Western Electric Company, Incorporated, New York, N. Y., a corporation of New York Application July 20, 1955, Serial No. 523,143

6 Claims. (Cl. 81—9.51)

This invention relates to machines for cutting and stripping insulated conductors, and more particularly to machines for simultaneously cutting two separate insulated conductors and stripping insulating coverings therefrom.

An object of the invention is to provide new and improved machines for stripping insulation from insulated wires.

Another object of the invention is to provide machines for simultaneously feeding, cutting and stripping insulations from a plurality of wires.

A further object of the invention is to provide machines for simultaneously advancing two insulated conductors between cutting and stripping tools, locating the wires precisely between the tools, cutting the wires in two and sequentially stripping insulating coverings from the ends of the wires adjacent to the cut ends thereof.

In a machine illustrating certain features of the invention, there may be provided a tool having opposed cutting blades and opposed pairs of stripping blades bracketing the cutting blades along with fingers for entering between a pair of insulated conductors positioned between the pairs of blades, and locating portions on the blades bracketing the fingers for precisely locating the conductors between the pairs of blades. A gripping member sequentially pulls a pair of cut insulated conductors from the stripping blades on one side of the pairs of conductors, then grips the other ends of the conductors, pulls them through the stripping blades on the other side of the cutting blades, and then advances the conductors a cord length between the pairs of blades.

In a machine forming an alternative embodiment of the invention, there may be provided cutting blades positioned between pairs of stripping blades, each of the stripping blades having a finger for entering between a pair of conductors to locate the conductors, and opposing grooves in the stripping blades. Fingers bracketing the first-mentioned fingers maintain the conductors in lateral alignment with the stripping blades.

A complete understanding of the invention may be obtained from the following detailed description of apparatus forming specific embodiments thereof, when read in conjunction with the appended drawings, in which:

Fig. 1 is a top plan view of an apparatus forming one embodiment of the invention;

Fig. 2 is a fragmentary, perspective view of a portion of the apparatus shown in Fig. 1;

Fig. 3 is a vertical section taken along line 3—3 of Fig. 1;

Fig. 4 is a vertical section taken along line 4—4 of Fig. 1;

Fig. 5 is a top plan view of a portion of a machine forming an alternative embodiment of the invention, and Fig. 6 is a fragmentary vertical section of a portion of the machine shown in Fig. 5.

Referring now in detail to the drawings, there is shown therein an apparatus for simultaneously stripping lengths of insulating covers 8 and 9 from insulated conductors 10 and 11 having wires 12 and 13 covered by the covers 8 and 9, and to cut lengths from the conductors 10 and 11 to form cords of relatively short wire lengths having both ends stripped of insulation. The machine shown in Figs. 1 through 4 includes a pair of tool heads 15 and 16, which are movable toward and away from each other. The tool heads carry stripping blades or jaws 21 and 22 in opposed positions thereon having opposed upper stripping notches 23 and opposed lower stripping notches 24.

The tool heads 15 and 16 also carry stripping blades or jaws 27 and 28 and upper stripping notches 29 and lower stripping notches 30 therein. The notches 23 and 24 in the jaws 21 and 22 are of the same configuration as the notches 29 and 30 in the jaws 27 and 28 (Fig. 2). Opposed shearing blades 31 and 32 are mounted on the tool heads 15 and 16, respectively, and have shearing edges 33 and 34 for cutting the conductors 10 and 11 in two when the tool heads 15 and 16 are moved together. At which time, pointed separating fingers 36 and 37 secured rigidly to the blades 31 and 32, respectively, enter between conductors 10 and 11 to precisely separate the conductors to positions in lateral alignment with the notches 23 and 24, 29 and 30 before the stripping blades 21, 22, 27 and 28 close on the conductors. Fingers 41 and 42 projecting beyond cutting edges 33 and 34 of the blades 31 and 32 serve to hold the conductors on the separating fingers 36 and 37. Fingers 45 and 46 located on the stripping blades 22 and 27, respectively, have cammed surfaces 47 and 48 thereon for camming the conductor 10 downwardly, if necessary, to hold it against the separating fingers 36 and 37, and fingers 50 and 51 carried by the blades 21 and 28 are provided with camming surfaces 52 and 53 for camming the conductor 11 upwardly to hold it against the fingers 36 and 37.

Jaws 61 and 62 are provided with upper notches 63 and lower notches 64 for gripping the conductors 10 and 11, respectively. The jaws 61 and 62 are carried and closed by a jaw-carrying-and-actuating mechanism 65 of a well known and commercially available type, which is reciprocable along a guide 66 by well known means (not shown), and is driven to close the jaws 61 and 62 on the conductors 10 and 11 and to open the jaws 61 and 62 and raise jaws above the level of the opposed blades 21, 22, 31, 32, 27 and 28. The conductors are advanced to the tool heads 15 and 16 from braking and guiding sheaves 73 and 74 through a wire guide 75 carrying pins 76 and 77 thereon having a horizontal pin 78 joining them, which serves to separate the two conductors.

In the operation of the apparatus, assuming the tool heads 15 and 16 to be in their open positions and the jaws 61 and 62 gripping the conductors 10 and 11 to the right of the tool heads 15 and 16, as viewed in Fig. 1, the conductors are held taut between the braking sheaves 73 and 74 and the jaws 61 and 62, the conductor 10 being held taut by the guide 75 and the jaws 61 and 62 at the level of the notches 23 and 29 and the conductor 11 being held taut directly below the conductor 10 and at the level of notches 24 and 30. The tool heads are actuated automatically by suitable means (not shown) of a well known type to move them together to sequentially move the fingers 36 and 37 between the conductors, engage the top of the conductor 10 with the fingers 45 and 46 and the bottom of the conductor 11 with the fingers 50 and 51 to hold the conductors against the fingers 36 and 37. This locates the conductors 10 and 11 precisely between the notches 23 and 29 and 24 and 30, respectively. The heads continue to close and the blades 31 and 32 shear the conductors, and then the blades 21 and 22, and 27 and 28 grip the conductors in the notches 23, 24, 29 and 30. The fingers 45, 46, 50 and 51 serve to precisely locate the conductors 10 and 11 as the stripping blades 21, 22, 27 and 28 close on the conductors. Then the carriage 65 is pulled to the right, as viewed in Fig. 1, to pull the cut lengths of the conductors 10 and 11 from the cutting blades 31 and 32, and the blades 27 and 28 strip the portions of the insulating covers to the left of the stripping notches 29 and 30.

The jaws 61 and 62 then are opened to drop the cut and stripped lengths of the conductors, are lifted above the level of the elements carried by the tool heads 15 and 16 and are moved completely to the left of the blades 21 and 22. The jaws 61 and 62 then are lowered while open to opposite sides of the conductors 10 and 11, are closed on the conductors 10 and 11 to grip them securely, and the carriage 65 is moved further to the left to strip the insulating covers on the conductors 10 and 11 between the blades 21 and 22 and the cutting blades 31 and 32. Then the tool heads 15 and 16 are opened to pull the elements carried thereon completely away from the conductors 10 and 11 and out of the path of the jaws 61 and 62, and the carriage 65 then is moved to the right to draw the conductors 10 and 11 between tool heads 15 and 16 for another cutting and stripping operation.

*Embodiment shown in Figs. 5 and 6*

In this embodiment of the invention, pointed centering pins 86 and 87 mounted on stripping blades 89 and 90 identical with the blades 21 and 28 slide along opposed stripping blades 93 and 94 identical with the blades 22 and 27 to precisely locate conductors 95 and 96 between stripping notches 97 and 98 in the blades. The notches 97 and 98 are of the same configuration as the notches 29 and 30 in the jaws 27 and 28 (Fig. 2). Also, the blades 93 and 94 have upper camming fingers 99 and 100 for locating the conductor 95 on the centering pin 86, and similarly, the blades 89 and 90 have lower camming fingers 101 and 102 for pushing the conductors 96 up to the pin 87. The operation of this embodiment of the invention is identical with that shown in Figs. 1 through 4, except that the centering fingers 86 and 87 are located on the stripping blades rather than on the cutting blades as are the fingers 36 and 37.

The above-described apparatus enables the cord stripping and cutting machine to simultaneously cut and strip lengths of insulating from two wires rather than one, thereby doubling the output of conventional machines.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A machine for cutting and stripping insulated conductors, which comprises a pair of cutting blades movable from open positions to closed positions for severing a pair of insulated wires, a pair of stripping blades each having a pair of wire-receiving notches and insulation-cutting edges movable from open positions to closed positions for cutting the insulations on the wires, a separator designed to locate the wires in lateral alignment with the notches when the wires are held laterally thereagainst, and means for holding the wires against the separator.

2. A machine for cutting and stripping insulated conductors, which comprises a pair of cutting blades movable from open positions to closed positions for severing a pair of insulated wires, a pair of stripping blades each having a pair of wire-receiving notches and insulation-cutting edges movable from open positions to closed positions for cutting the insulations on the wires, a separator designed to locate the wires in lateral alignment with the notches when the wires are held laterally thereagainst, and camming means for pushing the wires against the separator.

3. A machine for cutting and stripping insulated conductors, which comprises a pair of cutting blades movable from open positions to closed positions for severing a pair of insulated wires, a pair of opposed stripping blades each having a pair of wire-receiving notches and insulation-cutting edges movable from open positions to closed positions for cutting the insulations on the wires, a pair of separators carried with the cutting blades and projecting therebeyond for locating the wires in lateral alignment with the notches when the wires are held laterally thereagainst, and means carried by the stripping blades for holding the wires against the separator.

4. A machine for cutting and stripping insulated conductors, which comprises means for pulling a pair of wires along a predetermined path, a pair of opposed wire-working tools reciprocable toward and away from one another from opposite sides of said path, means projecting beyond the tools toward said path and movable with the tools for separating the wires prior to engagement of the wires by the tools, and means carried by the wire-working tools and cooperating with the wire separating means for precisely locating the wires in wire-working positions.

5. In an insulated wire-cutting and insulation-stripping machine including a pair of tool heads movable together and apart, means for moving the heads together and apart, a pair of jaws for gripping a pair of wires and means for moving the jaws so as to sequentially grip a pair of wires, pull the wires in one direction away from the heads while the heads are closed, pull the wires in the opposite direction between the heads when the heads are open, pull cut lengths of wires in said opposite direction from the heads when the heads are closed, release the cut lengths and travel in said one direction over the closed heads to gripping positions, the improvement comprising a pair of cutting blades mounted in opposed positions on the heads, two pairs of opposed stripping blades each blade having a pair of stripping notches, said pairs of blades being carried on the heads in positions bracketing the cutting blades, and fork-like wire-locaters carried by one of the heads for orienting the wires relative to the stripping notches.

6. In an insulated wire-cutting and insulation-stripping machine including wire-guiding means, a pair of tool heads movable together and apart, means for moving the heads together and apart, a pair of jaws for gripping a pair of wires and means for moving the jaws so as to sequentially grip a pair of wires, pull the wires away from the heads while the heads are closed, pull the wires between the heads when the heads are open, pull cut lengths of wires from the heads when the heads are closed, release the cut lengths and travel over the closed heads to gripping positions, the improvement comprising a pair of cutting blades mounted in opposed positions on the heads, two pairs of stripping blades each having a pair of stripping notches carried on the heads in positions bracketing the cutting blades, a pointed separator carried by one of the heads for separating the wires prior to engagement thereof by the cutting blades and the stripping blades, and fork means movable with the heads for locating the wires against the separator prior to engagement of the wires by the cutting blades and the stripping blades.

References Cited in the file of this patent

UNITED STATES PATENTS

| | | |
|---|---|---|
| 1,626,119 | Olin | Apr. 26, 1927 |
| 1,734,745 | Ray | Nov. 5, 1929 |
| 1,998,391 | Shaw | Apr. 16, 1935 |